Figure 1:
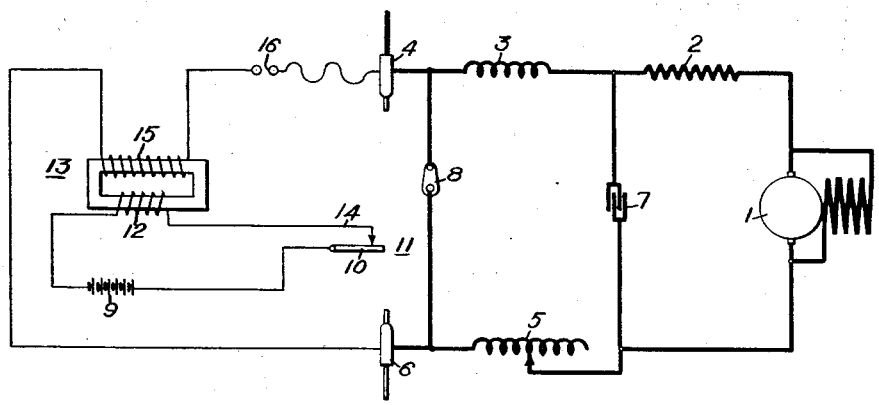

L. W. CHUBB.
ELECTROPERCUSSIVE WELDING.
APPLICATION FILED JUNE 9, 1919.

1,373,054.

Patented Mar. 29, 1921.

WITNESSES:
J. A. Helsel
O. E. Bee

INVENTOR
Lewis Warrington Chubb.
BY
Wesley G. Carr
ATTORNEY

UNITED STATES PATENT OFFICE.

LEWIS WARRINGTON CHUBB, OF PITTSBURGH, PENNSYLVANIA, ASSIGNOR TO WESTINGHOUSE ELECTRIC & MANUFACTURING COMPANY, A CORPORATION OF PENNSYLVANIA.

ELECTROPERCUSSIVE WELDING.

1,373,054.      Specification of Letters Patent.      Patented Mar. 29, 1921.

Application filed June 9, 1919. Serial No. 302,794.

*To all whom it may concern:*

Be it known that I, LEWIS WARRINGTON CHUBB, a citizen of the United States, and a resident of Pittsburgh, in the county of Allegheny and State of Pennsylvania, have invented a new and useful Improvement in Electropercussive Welding, of which the following is a specification.

My invention relates to electric welding and it has particular relation to a method of welding wires or other similar objects together by the application of heat of relatively great intensity at substantially the instant of percussive engagement of the surfaces to be welded, both the application of heat and the engagement of the bodies being of relatively short duration. The primary object of my invention is to facilitate the welding together of bodies having surfaces to be welded of relatively large area.

In Patent No. 1,066,468 issued to me July 8, 1913, I disclosed a method of, and apparatus for, welding together wires or other similar objects. By employing the method and apparatus disclosed in the above mentioned patent, unlike metals, such as tin and aluminum, copper and platinum, lead and tin, tin and platinum, tin and copper and nickel and platinum, may be united in such manner as to avoid that brittleness, at the point of union, which is experienced in joining such metals by ordinary methods.

Although the method described in the above mentioned patent is very satisfactory for welding together bodies in which the surfaces to be welded are of relatively small area, slight difficulty is experienced in employing the method for uniting relatively large areas.

One object of my present invention, therefore, resides in the provision of means for expediting the welding together of bodies in which the surfaces to be welded are of comparatively large area.

With these and other objects in view, my invention will be more fully described, illustrated in the drawings, in the several views of which corresponding numerals indicate like parts, and then particularly pointed out in the claims.

Figure 2:
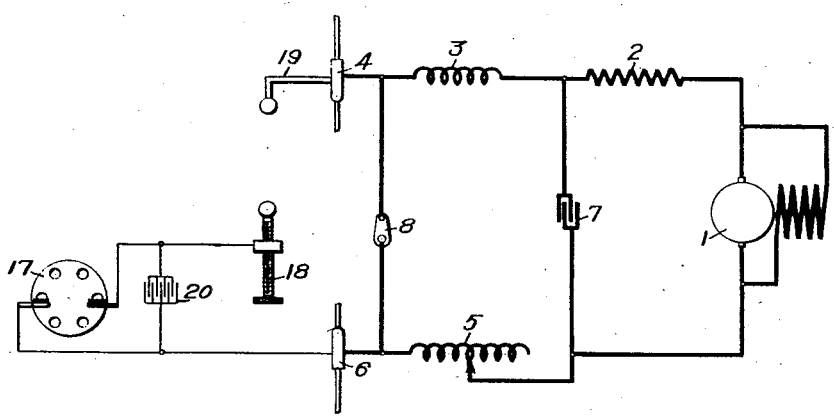

In the drawings, Figure 1 is a diagrammatic view of electric circuits which may be employed in welding together wires or other similar objects in accordance with my invention, and Fig. 2 is a similar view illustrating a modification of my invention.

In practising my invention, I may employ the main welding circuit and apparatus described and shown in the above mentioned patent. I have discovered, however, that, in some instances, an auxiliary exciting circuit may be advantageously employed in addition to the main welding circuit set forth in the above referred to patent. For example, I have found that wires of relatively large diameter may be readily welded together by employing an exciting circuit which causes an electric discharge to take place between the wires just previous to a second electric discharge from the main welding circuit. The advantage of the above mentioned initial discharge will be more fully appreciated from the description hereinafter set forth.

In practising the process described in the above-referred-to patent, wires of relatively small diameter were employed and such wires were provided with chiseled edges which resulted from the usual method of severing small wires, as by cutting them by means of wire cutters. The wires were welded together by employing apparatus in which they were secured, one of the wires being secured in a clamping or chuck member movable relative to a similar chuck member carrying the other wire. A suitable electric circuit was employed to obtain an electric discharge when the movable chuck was so dropped that the ends of the wires were brought into percussive engagement, the electric discharge taking place at the instant of engagement of the chiseled edges of the wires. The chiseled edges were volatilized and a portion of the volatilized metal was blown out on account of the concentration of the great amount of power at the instant of engagement. The effect thus obtained greatly facilitated the welding together of the wires to obtain a strong and ductile joint. Wires of relatively large diameter, however, usually possess comparatively flat ends on account of the methods employed in cutting such wires and, if chiseled ends are to be produced, some means other than that employed in cutting the wires must be provided.

The broad object of my invention resides, therefore, in the provision of an auxiliary electric circuit which may be employed with the apparatus and electric circuit disclosed in the above mentioned patent without the necessity of providing chiseled or sharpened edges upon the surfaces to be welded together. Since the apparatus and the electric welding circuit, employed in my previous invention, are fully illustrated and described in the patent, I have shown, in the drawings, only the necessary elements for an understanding thereof.

In Fig. 1 is shown a main welding circuit comprising a source of electric energy or generator 1, one terminal of which is connected, through a resistance 2 and an inductance 3, to a movable chuck member 4, and the other terminal of which is connected, through a variable inductance 5, to a stationary chuck member 6. A condenser 7 is connected in parallel relation to the generator 1, and a switch 8 is also connected in parallel relation to the generator 1 and the chuck members 4 and 6. The welding circuit thus described constitutes a preferred form of the welding circuit employed in my previous invention, the welding tool being illustrated only in the chuck members 4 and 6.

By my present invention, I have provided an auxiliary circuit comprising a source 9 of direct current connected at one side, to a movable element 10 of an interrupter 11 and connected, at its other side, through a primary winding 12 of a spark coil 13, to a stationary element 14 of the interrupter 11. I have provided a secondary circuit comprising a secondary winding 15 of the spark coil 13 which is connected, at one end, to the stationary chuck member 6 and, at its other end, through a spark gap 16, to the movable chuck member 4.

In operation, the switch 8 normally short-circuits the chuck members 4 and 6 and prevents charging of the condenser 7 by the generator 1. The wires, or objects to be welded, are properly secured in the chuck members 4 and 6, the chuck member 4 being raised to a suitable position to provide the necessary mechanical energy, velocity and momentum when released and allowed to drop. The switch 8 is then opened and the condenser 7 properly charged. The chuck member 4 may then be released and allowed to drop and, while so doing, it engages the movable element 10 of the interrupter 11 and opens the primary circuit containing the source of direct current 9. A relatively high voltage is, therefore, induced in the secondary coil 15, of the spark coil 13, which causes an electric discharge to bridge the gap 16, whereby a current having a relatively steep wave front results. On account of the steep wave front possessed by the spark impulse in the secondary part of the auxiliary circuit, the effect of the inductances 3 and 5 in the main welding circuit is highly accentuated and causes the current to seek a path between the approaching wires secured in the chuck members 4 and 6. An electric discharge, therefore, takes place between the approaching wires, thus closing the main welding circuit and causing the discharge of the condenser 7. The interrupter is, of course, so adjusted that the discharge, produced across the decreasing air gap between the approaching wires, will take place at such a time as to cause the discharge from the main welding circuit to occur substantially at the instant of percussive engagement of the ends of the wires. Heat of great intensity may thus be produced at substantially the instant the wires percussively engage. By employing the initial discharge from the auxiliary circuit, the effect obtained by the previously employed method of chiseling or sharpening the ends of the wires, or inserting conducting material of small cross-section, is substantially reproduced. It will be apparent, of course, that means other than a condenser may be employed for effecting the application of heat of great intensity at the instant of percussive engagement of the wires, if desired. For example, a direct-current generator may be advantageously employed in supplementing the discharge produced by the condenser and, by employing a generator together with a condenser, a desirable electric discharge may be obtained which, however, is maintained for a greater length of time.

It is obvious that the causing of the electric discharge in the main welding circuit, by employing an initial discharge to close the main welding circuit, may be accomplished in a variety of ways. In order to illustrate a modification of this method, I have shown, in Fig. 2, a modified form of auxiliary circuit comprising a source of relatively high direct voltage, such as a static machine 17, one terminal of which may be connected to an adjustable element 18 for establishing a spark gap. Another element 19, for establishing the spark gap with the element 18, may be rigidly connected or secured to the movable chuck member 4. The other terminal of the machine 17 may be connected to the stationary chuck member 6, and a means for producing an electric discharge, such as a condenser 20, may be connected in parallel relation to the terminals of the machine 17.

In operation, the auxiliary circuit above described, accomplishes the desired result in substantially the same manner as the auxiliary circuit shown in Fig. 1. When the movable chuck member 4 is dropped it causes percussive engagement of the wires, the gap, between the elements 18 and 19 is, of course, reduced, as the chuck member drops and when it reaches a pre-determined length, the condenser 20 will cause an electric discharge to bridge the gap and it will also cause an electric discharge to bridge the gap between the approaching wires, the adjustable member 18 being so adjusted as to cause the above mentioned discharge at the right instant. On account of the fact that the current in the auxiliary circuit possesses a steep wave front, occasioned by the spark gap between the elements 18 and 19, a discharge takes place between the approaching wires rather than through the main welding circuit containing the inductances 3 and 5.

It will be apparent, therefore, that the auxiliary circuit, shown in Fig. 2, accomplishes the same result as the auxiliary circuit shown in Fig. 1 and, furthermore, the manner of accomplishing this result is, obviously, substantially the same. The spark gap, in both auxiliary circuits, prevents the condenser, in the main welding circuit, from discharging through the auxiliary circuit and also produces the steep wave front which prevents the auxiliary current from circulating in the main welding circuit.

I have found by employing an auxiliary circuit, such as above described, wires of relatively large diameter having substantially flat ends may be satisfactorily welded together. The joint produced, by so welding wires together, is very uniform and possesses none of the brittleness which is usually experienced in welding together wires of unlike metals, such as before mentioned.

Although I have described a plurality of welding circuits which may be employed in uniting wires or other similar objects it will be obvious that minor changes may be made in such circuits without departing from the spirit of my invention and I desire, therefore, that no limitations shall be imposed except such as are indicated in the appended claims.

I claim as my invention:—

1. The process of welding metal bodies that comprises effecting an electrical discharge between the bodies, causing a percussive engagement of the surfaces to be welded and applying heat of great intensity to said surfaces.

2. The process of welding metal bodies that comprises effecting an electrical discharge between the bodies, causing a percussive engagement of the surfaces to be welded and substantially simultaneously effecting an instantaneous application of heat of great intensity to said surfaces.

3. The process of welding metal bodies that comprises causing an electrical discharge to bridge a predetermined gap between the surfaces to be welded, effecting a second electrical discharge started by the first and causing percussive engagement of the surfaces substantially at the instant of the second electrical discharge.

4. An electric welding system comprising means for effecting percussive engagement of the surfaces of parts to be welded, a main welding circuit connected to the parts, a condenser connected in parallel relation to the parts and an auxiliary circuit associated with the parts including means for causing an arc to bridge a gap between the parts to cause discharge of the condenser in the welding circuit.

5. An electric welding system comprising means for effecting percussive engagement of the surfaces of parts to be welded, a main welding circuit connected to the parts, a condenser connected in parallel relation to the parts, a source of direct current and means for causing an arc to bridge a gap between the parts to cause discharge of the condenser in the welding circuit, said means being energized from the direct-current source and including a plurality of inductively related windings, one of which is connected to said source and the other of which is connected to the parts to be welded.

6. An electric welding system comprising means for effecting percussive engagement of the surfaces of parts to be welded, a main welding circuit connected to the parts, a condenser connected therein in parallel relation to the parts, a source of direct current and a plurality of inductively related windings, one of which is connected to said source and the other of which is connected to the parts to be welded.

7. An electric welding system comprising a plurality of clamping members for parts to be welded, means for effecting percussive engagement of said parts, a welding circuit connected to said parts and including a condenser, a source of direct current, a plurality of inductively related coils one of which is connected to the source of direct current and the other of which is connected to the parts to be welded, an interrupter so connected between the source of direct current and the coil connected thereto as to open the circuit when said parts are at a predetermined distance from each other.

8. An electric welding system comprising a plurality of clamping members for parts to be welded, means for effecting percussive engagement of said parts, a welding circuit connected to said parts and including a condenser, a source of direct current, a plurality of inductively related coils one of which is connected to the source of direct current and the other of which is connected to the parts to be welded, an interrupter so connected between the source of direct current and the coil connected thereto as to open the circuit when said parts are at a predetermined distance from each other and means for preventing the condenser from discharging through the coils.

9. An electric welding system comprising a plurality of clamping members for parts to be welded, means for effecting percussive engagement of said parts, a welding circuit connected to said parts and including a condenser, means for effecting an electric discharge connected to the clamping members and means actuated by one of the clamping members for causing the discharge.

10. An electric welding system comprising a plurality of clamping members for parts to be welded, means for effecting percussive engagement of said parts, a welding circuit connected to said parts and including a condenser, an exciting circuit containing an air gap adapted to be closed by one of the clamping members and means, connected in the exciting circuit, for causing an electrical discharge in said air gap at a predetermined instant and a second discharge between the parts to be welded.

11. An electric welding system comprising means for effecting percussive engagement of the surfaces of parts to be welded, a main welding circuit connected to the parts, a condenser connected therein in parallel relation to the parts, a source of direct current and a plurality of inductively related windings, one of which is connected to said source and the other of which is connected to the parts to be welded, and means for preventing current from said direct current source from flowing in said main welding circuit.

In testimony whereof, I have hereunto subscribed my name this 29th day of May 1919.

LEWIS WARRINGTON CHUBB.